(12) United States Patent
Colbourne et al.

(10) Patent No.: US 8,233,794 B2
(45) Date of Patent: Jul. 31, 2012

(54) HITLESS MXN WAVELENGTH SELECTIVE SWITCH

(76) Inventors: Paul Colbourne, Ottawa (CA); Sheldon McLaughlin, Ottawa (CA); Stephen Robert de Hennin, Ottawa (CA); Pierre D. Wall, Ottawa (CA)

(*) Notice: Subject to any disclaimer, the term of this patent is extended or adjusted under 35 U.S.C. 154(b) by 417 days.

(21) Appl. No.: 12/555,902

(22) Filed: Sep. 9, 2009

(65) Prior Publication Data

US 2010/0061727 A1    Mar. 11, 2010

Related U.S. Application Data

(60) Provisional application No. 61/095,324, filed on Sep. 9, 2008, provisional application No. 61/117,408, filed on Nov. 24, 2008.

(51) Int. Cl.
*H04J 14/00* (2006.01)
*G02B 6/35* (2006.01)
*G02B 5/08* (2006.01)
*H04B 10/12* (2006.01)

(52) U.S. Cl. ............ 398/48; 398/45; 398/43; 398/42; 385/18; 385/16; 375/130

(58) Field of Classification Search .......... 398/43, 398/45, 48
See application file for complete search history.

(56) References Cited

U.S. PATENT DOCUMENTS

| | | | |
|---|---|---|---|
| 5,651,080 A * | 7/1997 | Chu et al. | 385/28 |
| 5,812,290 A * | 9/1998 | Maeno et al. | 398/45 |
| 6,707,959 B2 | 3/2004 | Ducellier et al. | 385/17 |
| 6,810,169 B2 | 10/2004 | Bouevitch | 385/24 |
| 7,822,303 B2 * | 10/2010 | Cohen et al. | 385/18 |
| 2003/0031403 A1 * | 2/2003 | Taylor et al. | 385/18 |
| 2007/0242953 A1 * | 10/2007 | Keyworth et al. | 398/48 |
| 2007/0280589 A1 * | 12/2007 | Stowe et al. | 385/19 |
| 2007/0280590 A1 * | 12/2007 | Stowe et al. | 385/19 |
| 2008/0063028 A1 * | 3/2008 | Lekkas et al. | 375/130 |
| 2008/0266637 A1 * | 10/2008 | Martinelli et al. | 359/226 |
| 2009/0304328 A1 * | 12/2009 | Presley et al. | 385/16 |
| 2010/0061727 A1 * | 3/2010 | Colbourne et al. | 398/48 |
| 2010/0172646 A1 * | 7/2010 | Colbourne | 398/49 |
| 2011/0234951 A1 * | 9/2011 | Cohen | 349/113 |

OTHER PUBLICATIONS

Roorda et al., "Evolution to Colorless and Directionless ROADM Architectures", OFC 2008, paper NWE2.

* cited by examiner

*Primary Examiner* — Shi K Li
*Assistant Examiner* — Oommen Jacob
(74) *Attorney, Agent, or Firm* — Teitelbaum & MacLean; Neil Teitelbaum; Doug MacLean

(57) ABSTRACT

A wavelength selective switch (WSS) based on an array of MEMS mirrors tiltable in 1-dimension about only one axis exhibits "hitting" or unwanted port connections during switching. Two WSS's can be cascaded to create M×N switching functionality in a hitless manner by the inclusion of block ports at specified positions in one or both of the WSS's. Greater use efficiency of ports can be achieved if quasi-hitless performance is acceptable.

1 Claim, 15 Drawing Sheets

HITLESS MXN WAVELENGTH SELECTIVE SWITCH

CROSS-REFERENCE TO RELATED APPLICATIONS

The present invention claims priority from U.S. Provisional Patent Application No. 61/095,324, filed Sep. 9, 2008 and U.S. Provisional Patent Application No. 61/117,408, filed Nov. 24, 2008, both of which are incorporated herein by reference.

TECHNICAL FIELD

The present invention relates to optical wavelength switches configured for hitless or quasi-hitless operation in fiberoptic telecommunications, in particular to wavelength selective optical switches based on micro-electro-mechanical systems (MEMS) for use in reconfigurable optical add-drop modules (ROADMs) for dense wavelength division multiplex (DWDM) systems.

BACKGROUND OF THE INVENTION

Advanced optical network technologies such as Dense Wavelength Division Multiplexing (DWDM) form the foundation for fiberoptic telecommunications networks, enabling worldwide traffic aggregation and metro and regional network consolidation. Such optical fiber networks often use reconfigurable optical add-drop modules (ROADMs) to deliver new flexibility to DWDM networks by enabling dynamic, transparent optical wavelength add/drop functioning.

In general networks, the degree (D) of a network node is usually taken to mean a measure of how many network nodes are connected immediately adjacent to that node.

Wavelength selective switch (WSS) technology incorporated in ROADMs may use multi-degree (nD) ROADM architectures with a broadcast-and-select architecture. An optical splitter distributes wavelengths to a 'drop' path fixed wavelength demultiplexer and to each express direction. For each outgoing direction, a WSS is used to selectively combine 'add' wavelengths from an 'add' path fixed-wavelength multiplexer with channels selected from each express direction.

In many current architectures, a particular transmitter can send signals in only one output direction, towards only one adjacent network node. However, a 'degreeless' architecture is preferable, in which a particular transmitter can send signals to any direction, that is, to any adjacent node. As the optical fiber networks evolve toward 'degreeless' architectures, many implementations of these architectures require a M×N WSS function, as described by Peter Roorda and Brandon Collings ("Evolution to Colorless and Directionless ROADM Architectures", OFC 2008, paper NWE2). WSS technology is well-suited to extending ROADMs to allow automated assignment of the add/drop wavelength, a functionality often referred to as colorless switching. Colorless ROADM architectures address the full automation of wavelength assignment, but the outbound direction of the transponders remains fixed.

For example, a power splitter may be used to broadcast the 'add' wavelengths to a WSS for each direction, and another WSS is used to select the direction for the associated 'drop' wavelength. Using this architecture with a colorless MUX/DEMUX and amplifiers for compensating insertion loss, an 'add/drop' port can be assigned to any wavelength and coupled to any direction in a fully automated fashion.

A basic simplified structure of a 1×N WSS using arrays of adjustable reflectors. The adjustable reflectors may be MEMS mirrors that can be tilted in 1-dimension about one axis, as shown in top view in FIG. 1a. This has been described by Ducellier et al. in U.S. Pat. No. 6,707,959 issued Mar. 16, 2004, which is incorporated herein by reference. Port switching in the plane of the drawing is effected by suitably tilting MEMS mirrors of a modifying (MEMS) array about an axis.

In this example according to prior art, a basic simplified wavelength switching module 102A comprises a light redirecting element, such as a spherical reflector 120, used to receive a beam of light comprising wavelength multiplexed signals from a front-end unit 122 and to re-image the beam onto a micro-electro-mechanical systems (MEMS) array 126 after reflection off a diffraction grating 124. Due to the optical dispersion of the diffraction grating 124, a separate image is formed on the MEMS mirror array 126 for every wavelength multiplexed signal present in the beam of light.

Each MEMS mirror of the array is arranged so that it reflects the image corresponding to a wavelength multiplexed signal back to the front-end unit 122 via the diffraction grating 124 and the spherical reflector 120. The mirrors are fabricated to enable tilting about an axis perpendicular to the plane of FIG. 1a by means of a suitable controller.

FIG. 1b shows the front end of the WSS of FIG. 1a in greater detail. Four ports can be used for inputs or outputs with MEMS mirrors used for coupling a particular wavelength multiplexed signal between any two ports. For example, this WSS could be used as a 3×1 switch, i.e. with 3 input ports and 1 output port.

In FIG. 1b, an optically equivalent front end of the wavelength switching module 102A of FIG. 1a comprises four input/output ports 132A-D such as optical fibers, each carry wavelength multiplexed signals. The light beams from the optical fibers 132A-D are collimated by lenses 134A-D before passing through a switching lens 136, which converts the spatial separation between the ports 132A-D to an angular separation at an intersection point 150. Since the rest of the optics in the wavelength switching module 102A serve to re-image intersection point 150 onto the MEMS array 126, for the purposes of this description each tilting MEMS mirror corresponding to a particular wavelength multiplexed signal can be considered as being located at the intersection point 150.

Details of the imaging and dispersing optics are well known in the art, for instance as described by Bouevitch et al. in U.S. Pat. No. 6,810,169 issued Oct. 26, 2004, which is incorporated herein by reference.

FIG. 1c illustrates in greater detail such a prior art 2×2 WSS structure based on tilting MEMS mirror arrays in conjunction with optical circulators. Two optical inputs, 'IN' 11 and 'ADD' 21, carrying wavelength multiplexed signals entering bi-directional ports 31 and 32 through circulators 10 and 20 are focused by lens 35 into beams 41 and 42, respectively, onto an intersection point N. A concave mirror 40 re-images intersection point N via a diffraction grating 50 and transmission path correction element 100 onto MEMS tilting mirrors 61, 62 of a MEMS array 60. After reflection off the MEMS tilting mirrors 61, 62 the beams return by essentially the same route to the intersection point N from where they are collimated into the bi-directional ports 31 and 32, for transmission through circulators 10 and 20 into 'EXPRESS' 12 and 'DROP' 22 outputs, respectively.

There are essentially two possible choices for the axis about which the MEMS mirrors are tilted: vertical or horizontal. In principle there is no difference between the two, however factors such as optical beam cross-section, spot shape, preferred operating configuration, switch module geometry and similar would in practice determine the choice. Thus FIG. 1b could be regarded as a top view for the case where the MEMS mirrors are tilted about a vertical axis, whereas the same figure can be regarded as side view for the case where the MEMS mirrors are tilted about a horizontal axis. The latter case will be used without loss of generality in the following description with the understanding all the embodiments would be equally functional for the vertical axis case.

FIG. 2a shows a possible way of configuring a M×N WSS from a M×1 WSS and a 1×N WSS. This example illustrates 5 input ports and six output ports forming a 5×6 WSS. In this configuration, the single output of the M×1 WSS and the single input of the 1×N WSS are connected together.

Each wavelength multiplexed signal can be routed independently, however only one instance of each wavelength multiplexed signal can be passed from an input port to an output port. In other words, the configuration exhibits "wavelength blocking", which poses an obstacle to achieving true arbitrary configurability.

As achieving true arbitrary configurability is considerably more difficult, network designers are likely to accept the wavelength blocking restriction in their designs.

Another potentially more serious problem with the configuration of FIG. 2a is "hitting" during switching operations, which results in unwanted transient signals appearing at the output ports during switching operations.

It is an object of the invention to provide an M×N WSS which performs wavelength switching without "hitting", i.e. a hitless M×N WSS.

A further object is to provide a hitless M×N WSS that can take advantage of low-cost, manufacturable MEMS mirrors which are tilted only in 1-dimension.

Another object of the invention is to provide a method of operating such M×N WSS in a hitless or quasi-hitless manner.

SUMMARY OF THE INVENTION

Accordingly, the present invention relates to an optical switching device which performs wavelength switching without "hitting".

An aspect of the present invention relates to a first stage M×1 WSS concatenated with a second stage 1×N WSS using 1D tilting MEMS mirror arrays as switching elements, employing one block port on the first stage WSS to obtain quasi-hitless M×N switching.

Another feature of the present invention provides for additional block ports in either the first stage or the second stage to obtain completely hitless M×N switching.

In particular, the present invention relates to an optical switching device, comprising a first wavelength selective switch stage with a plurality of input ports, each input port for receiving a respective DWDM signal; a first common port for transmitting one of the respective DWDM signals; a first adjustable reflector for selecting an optical path for a selected one of the respective DWDM signals between one of the plurality of input ports and the first common port; and a first input block port disposed between the first common port and at least one of the input ports for providing the first adjustable reflector an interim position in which no signal is input to the first output port.

The optical switching device also includes a second wavelength selective switch stage comprising a second common port optically coupled to the first common port for receiving the selected DWDM signal; a plurality of output ports for transmitting the selected DWDM signal; a second adjustable reflector for selecting an optical path for the selected DWDM signal between the first common port and one of the plurality of output ports; and a switch controller for optically coupling the block port and the first common port when the second adjustable reflector is adjusted between settings.

BRIEF DESCRIPTION OF THE DRAWINGS

The invention will be described in greater detail with reference to the accompanying drawings which represent preferred embodiments thereof, wherein.

DETAILED DESCRIPTION

To address the problem associated with "hitting" in wavelength selective switches (WSS), the present invention provides structures modified to include block ports and methods of operating them in fully hitless as well as quasi-hitless modes.

For example, "hitting" is said to occur when a particular wavelength multiplexed signal gets switched from one output port to another output port, such that interfering signals momentarily appear at intervening output ports during the switching operation.

In conventional 1×N WSS devices based on MEMS mirror arrays, hitless operation can be achieved by using biaxial tilting MEMS mirrors. While normally a M×1 or a 1×N WSS device results in a hitting WSS, in this disclosure it is shown how a cascaded configuration of two WSSs using uniaxial tilting MEMS mirrors can be used for hitless or quasi-hitless operation. It is necessary to design the WSS devices appropriately and operate them in the correct sequence to achieve hitless operation.

Furthermore, as described below, there are various options to achieve hitless operation. Options are described which allow the greatest number of usable input and output ports for a given MEMS mirror tilt angle capability.

Figure 2A:
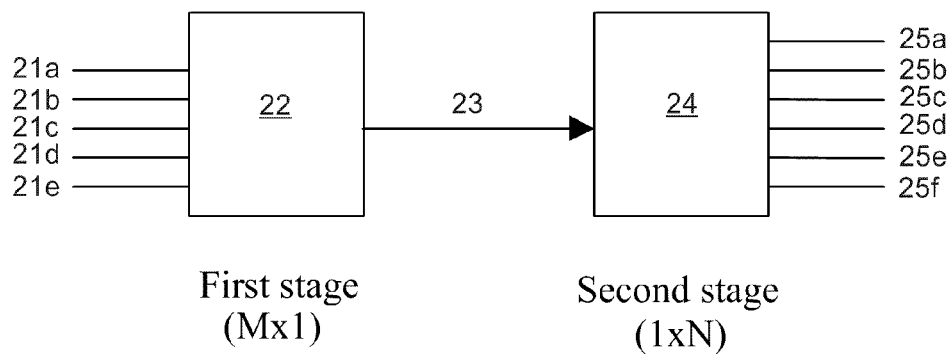
FIG. 2a is a block diagram of a M×1 WSS and a 1×N WSS concatenated to create a M×N WSS functionality.

FIG. 2a shows a possible way of configuring a M×N WSS from a M×1 WSS and a 1×N WSS. This example illustrates 5 input ports and six output ports forming a 5×6 WSS.

It has a first stage comprising a M×1 WSS 22 and a second stage comprising a 1×N WSS 24 concatenated through a common port to achieve the required M×N functionality. M denotes the number of input ports 21a-21e and N denotes the number of output ports 25a-25f. In this exemplary case, M=5 and N=6, giving a 5×6 WSS.

Each of the input ports 21a-21e can accept a lightwave beams comprising several wavelength multiplexed signals, as is typical in a DWDM network. The M×1 WSS 22 of the first stage comprises a MEMS mirror for each wavelength in its operating wavelength band. By appropriate angling or tilting under the control of a first controller (not shown), each mirror selects a corresponding wavelength multiplexed signal from one of the M input ports 21a-21e and reflects it onto the common port 23. The 1×N WSS 24 performs this process in reverse by receiving the input wavelength multiplexed signals selected by the first stage M×1 WSS 22 from the common port 23. Each corresponding MEMS mirror reflects to one of the N output ports 25a-25f by appropriate angling or tilting under the control of a second controller (not shown).

One concern for network operators is "hitting" during switching operations. "Hitting" occurs when spurious transient signals appear at the output ports during switching operations.

In certain network configurations, "hitting" during switching operations can cause interference in other signals. For example, in FIG. 2a, if in the second stage WSS 24 a wavelength multiplexed signal j is switched from output port 25a to output port 25c, it will momentarily appear on output port 25b. Another wavelength multiplexed signal k may also be routed to output port 25b, carrying signal traffic. If output port 25b is connected to a receiver with no wavelength discrimination, the wavelength multiplexed signal j will interfere with the reception of the wavelength multiplexed signal k, causing a temporary network interruption for the signal at wavelength k.

This is an unacceptable situation for network operators. Note that even if a signal at a particular wavelength on a particular input port is not being used, it may be present and therefore could cause interference if it is inadvertently routed to an undesired output port during a switching operation. In general one must assume that all possible wavelength signals are present at all inputs.

Figure 1A:
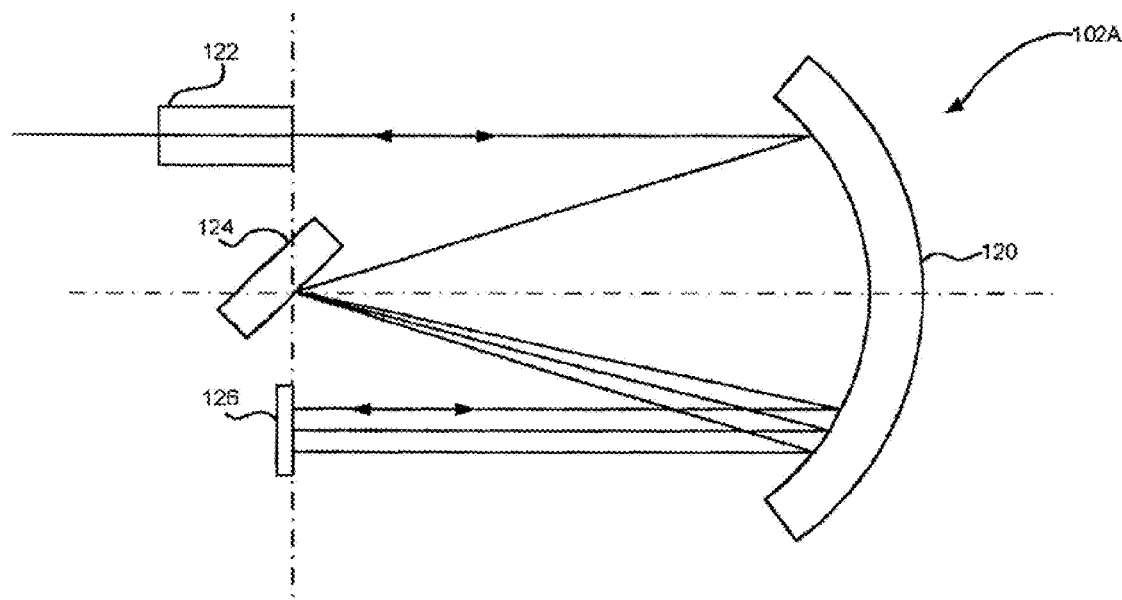
FIG. 1a is a top view schematic diagram of a prior art wavelength selective switch (WSS)
Figure 1B:
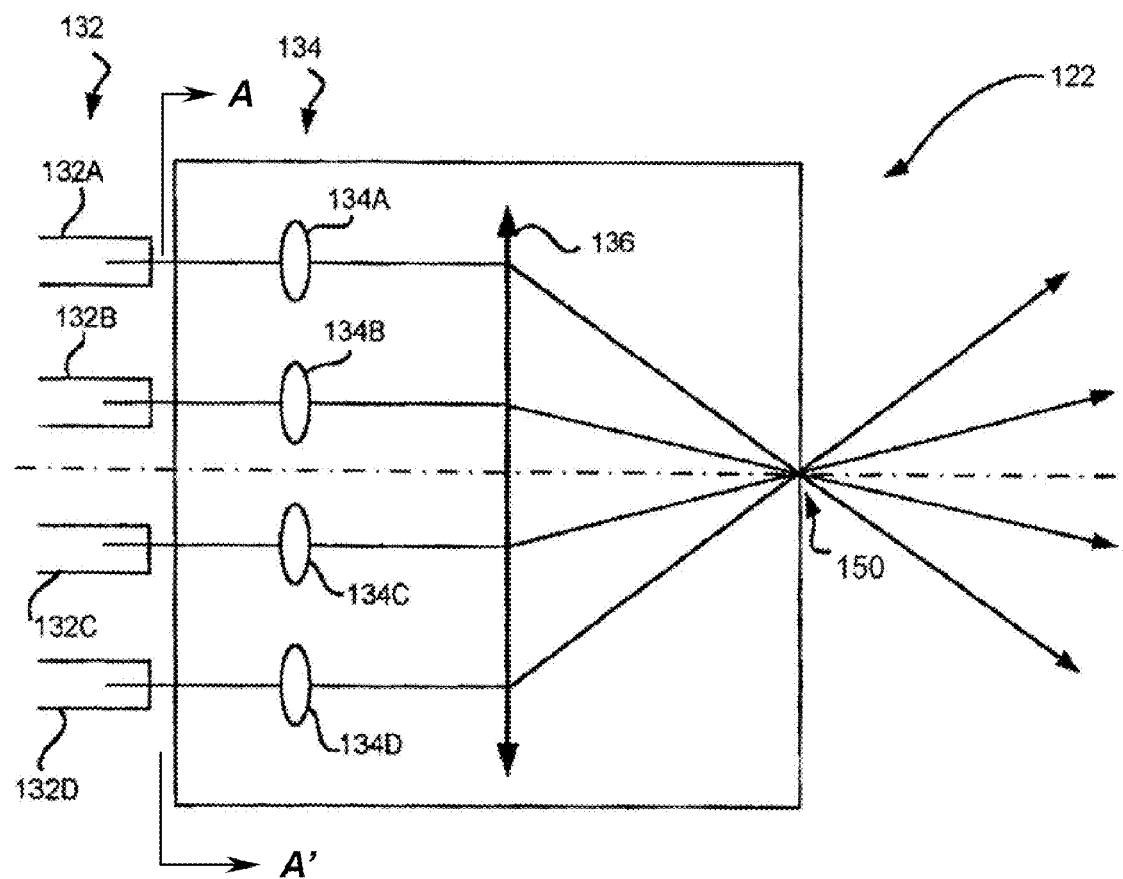
FIG. 1b is simplified equivalent schematic diagram of a prior art WSS.
Figure 2B:
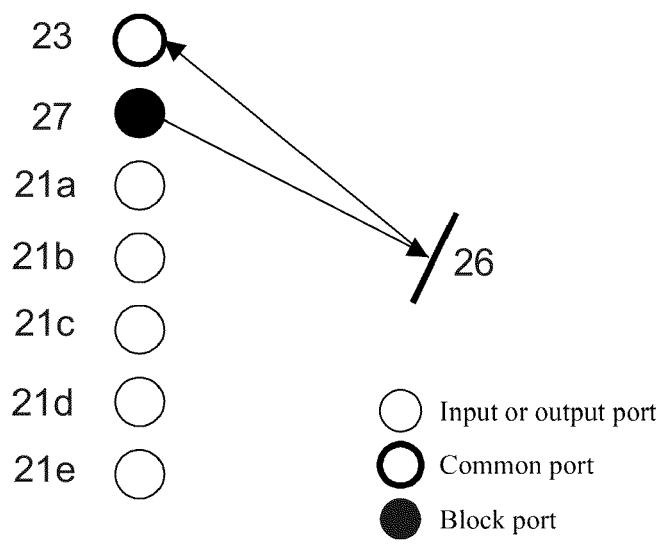
FIGS. 2b and 2c are schematic cross-sectional views at A-A' from point 150 of FIG. 1b showing input, output and block ports of a hitless WSS in a 'block' and 'transmit' setting, respectively, according to the present invention.

This problem can be explained using the following example. FIG. 2b shows port detail of the first stage WSS in FIG. 2a as a schematic cross-sectional view of switch ports on the front end, similar to the view seen at A-A' from point 150 in FIG. 1b. In accordance with this invention, a block port 27 has been added to the prior art first stage WSS in FIG. 2a. The five input ports 21a-21e, the output or common port 23 and the block port 27 appear end-on in a collinear arrangement. For the purposes of this example, an adjustable reflector such as a MEMS mirror 26 is also included, although it would in fact be located above the plane of the drawing. When tilted about an axis parallel to the plane of the drawing, the MEMS mirror 26 can provide optical coupling for a lightwave beam between the respective ports. The MEMS mirror 26 may also be tiltable about another axis or even two axes in two dimensions depending on the functionality required by a particular application.

In FIG. 2b the MEMS mirror 26 is configured in a setting where the block port 27 is coupled to the output port 23. Now, as the MEMS mirror 26 is reconfigured to the setting shown in FIG. 2c where input port 21c is coupled to the output port 23, input ports 21a and 21b will momentarily be coupled to the output port 23. This momentary appearance of signals from input ports 21a and 21b at the output port 23 is called "hitting".

Figure 2C:
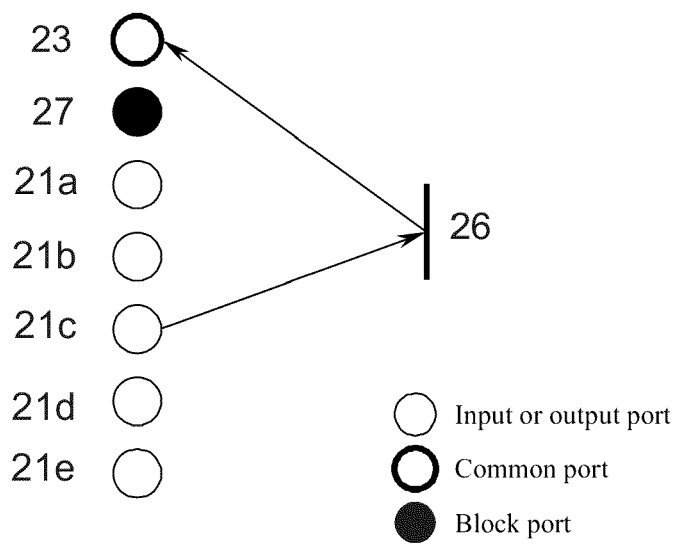

In this example the MEMS mirror 26 must have sufficient angular tilt range to couple 6 ports (input ports 21a-21e, block port 27) to the output port 23. The block port 27 could be a real port in the WSS 22, chosen to be unused in a particular application, or the lens and fiber that would normally occupy this location could be absent. It is important that even if the block port 27 is not physically present, the MEMS mirror 26 must have sufficient angular tilting range to access the block port 27 if the block function is required in the WSS 22 (no input to output couplings). In FIGS. 2b and 2c, the optical paths could be reversed, such that the output port 23 is used as an input port, and input ports 21a-21e become output ports; in this case the device is referred to as a 1×N WSS (1×5 in the example of FIGS. 2b and 2c).

Figure 8A:
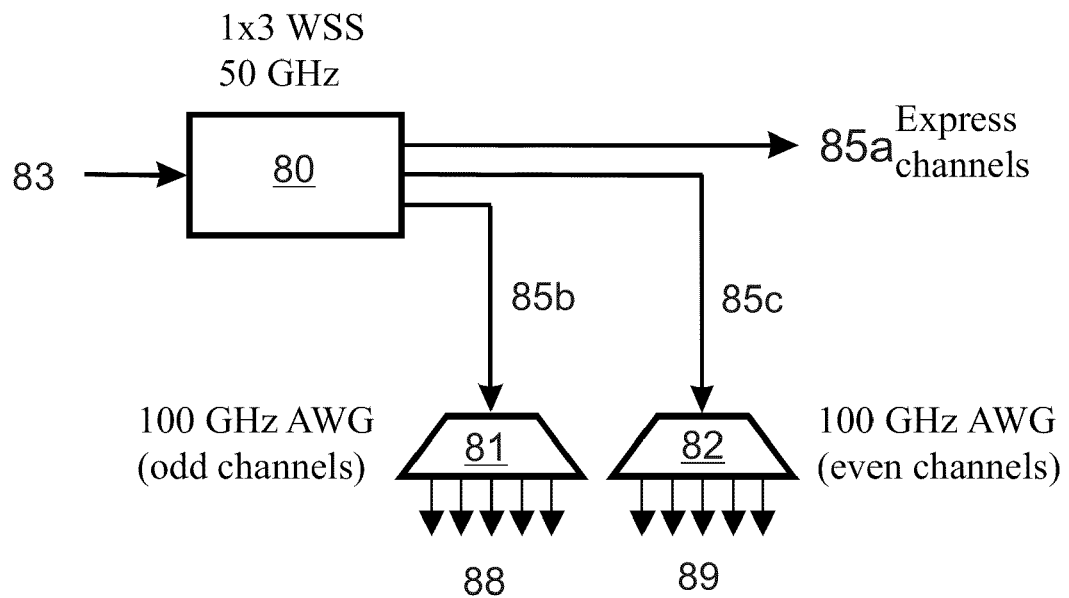
FIG. 8a is a block diagram of a network node design using a 1×3 WSS for odd-even separation of channels.
Figure 8B:
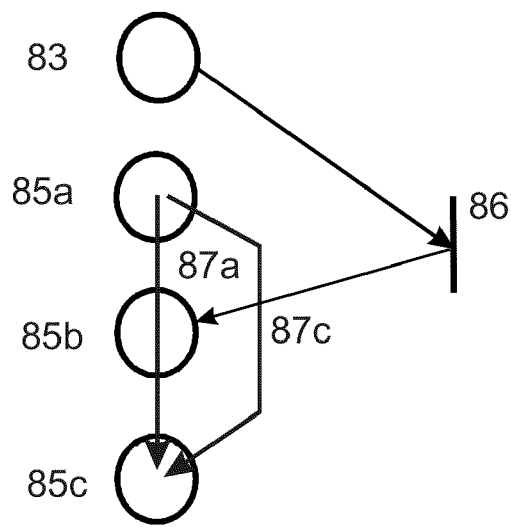
FIGS. 8b and 8c are simplified drawings of a 1×3 WSS showing two approaches to making it hitless.

Using the WSS 80 presented in FIGS. 8a and 8b as an example, a possible way of preventing "hitting" is described here. A wavelength multiplexed signal or an optical channel beam entering through input port 83 is redirected by a biaxially tilting MEMS mirror 86 from output port 85a to 85c along a '2-dimensional path' 87c as illustrated in FIG. 8b. Before tilting the MEMS mirror 86 about a first axis to perform switching, a controller mirror first tilts the MEMS mirror 86 about a second axis to direct the optical channel beam away from the output ports, so as to prevent the optical channel beam from hitting output port 85b.

However, for low manufacturing cost it is desirable to obtain hitless operation of the two stage M×N WSS of FIG. 2a with only 1-dimensional tilting MEMS. In accordance with instant invention, this can be accomplished by incorporating one or more block ports into the constituent WSS's.

Figure 3:
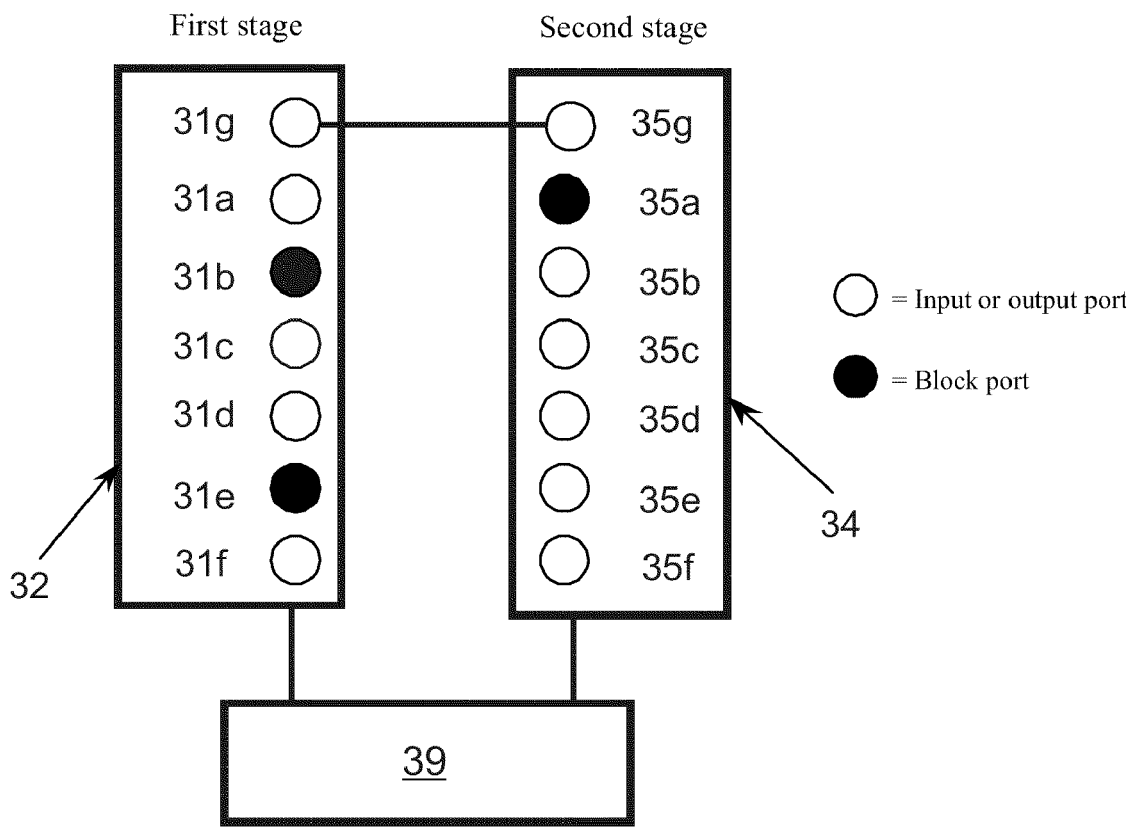
FIGS. 3 and 4 are cross-sectional views at A-A' from point 150 of FIG. 1b showing input, output and block ports of a fully hitless WSS according to the present invention.

FIG. 3 is a view similar to those in FIGS. 2b and 2c, however the port configuration shown provides hitless operation of a 4×5 WSS. The first stage WSS 32 has input ports 31a, 31c, 31d, 31f, two block ports 31b, 31e, and an output or common port 31g, while the second stage WSS 34 has five output ports 35b-35f, one block port 35a, and an input or common port 35g. The first stage WSS 32 and the second stage WSS 34 is concatenated by connecting the output port 31g with the input port 35g.

Of course the number of ports can be increased or decreased depending on the angular tilt range of the MEMS mirrors and the number of ports required in a particular application. In FIG. 3, the first stage WSS 32 has a block port 31b (31e) adjacent to every input port 31a, 31c (31d, 31f), respectively. As can be seen from FIG. 3, block ports between each pair of input ports are not necessary, for example there is no block port between input ports 31c and 31d. The switching between ports is effected by means of the adjustable reflectors or MEMS mirrors in the first and second stage under the control of a switch controller 39.

At least one third of the potential input ports must be used as block ports to achieve one block port adjacent to every input port. The second stage WSS 34 has only one block port 35*a*. The switching procedure for reconfiguring a particular wavelength from a first combination of input and output ports to a second combination of input and output ports is:

1. switch first stage 32 to a block port adjacent to the current input port;
2. switch second stage 34 to the block port 35*a*;
3. switch first stage 32 to a block position adjacent to the final input port;
4. switch second stage 34 to the desired output port; and
5. switch first stage 32 to the desired input port.

For example, if the initial setting for a wavelength multiplex signal j couples input 31*d* to output 35*f*, and the desired setting after reconfiguration is to connect input 31*a* to output 35*b*, the switching procedure would be:

1. switch first stage 32 from input port 31*d* to block port 31*e*;
2. switch second stage 34 from output port 35*f* to block port 35*a*;
3. switch first stage 32 from block port 31*e* to block port 31*b*;
4. switch second stage 34 from block port 35*a* to output port 35*b*; and
5. switch first stage 32 from block port 31*b* to input port 31*a*.

With this sequence, at no time do any undesired signals emerge from any output port. In FIG. 3, both the first stage WSS 32 and the second stage WSS 34 must have a MEMS mirror tilt angle range capable of addressing six distinct ports; the first stage has only 4 usable input ports because two port locations must be reserved as block ports, and the second stage has only five usable output ports because one port must be assigned as a block port.

Figure 4:
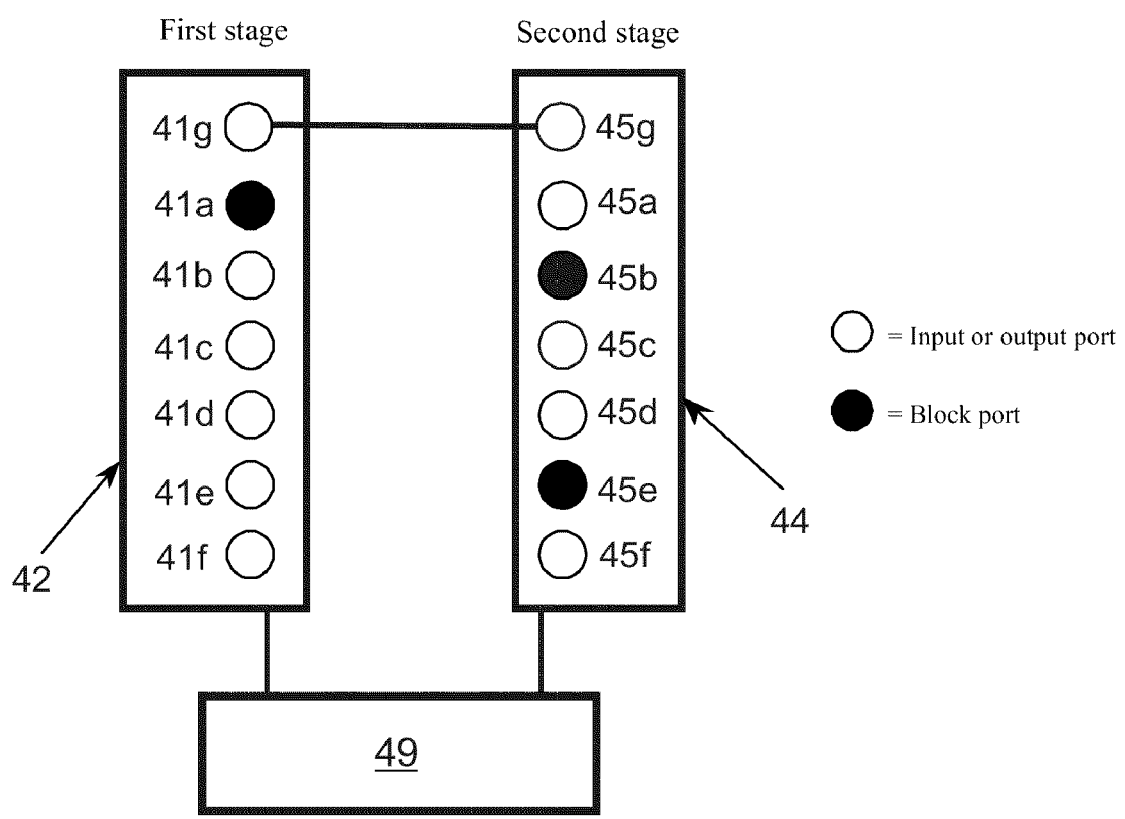

FIG. 4 shows a similar arrangement, this one providing hitless operation for a 5×4 WSS. The first stage WSS 42 has input ports 41*b*-41*f*, an output port 41*g*, and a block port 41*a*, while the second stage WSS 44 has five output ports 45*a*, 45*c*, 45*d* and 45*f*, an input port 45*g* and two block ports 45*b*, 45*e*. The switching between ports is effected by means of the adjustable reflectors or MEMS mirrors in the first and second stage under the control of a switch controller 49.

The switching procedure for this configuration is:

1. switch second stage 44 to a block port adjacent to the current output port;
2. switch first stage 42 to the block port 41*a*;
3. switch second stage 44 to a block position adjacent to the final output port;
4. switch first stage 42 to the desired input port; and
5. switch second stage 44 to the desired output port.

The main difference between the configurations of FIGS. 3 and 4 is that the one in FIG. 3 provides the greater number of output ports, while the one in FIG. 4 provides the greater number of input ports.

Figure 5:
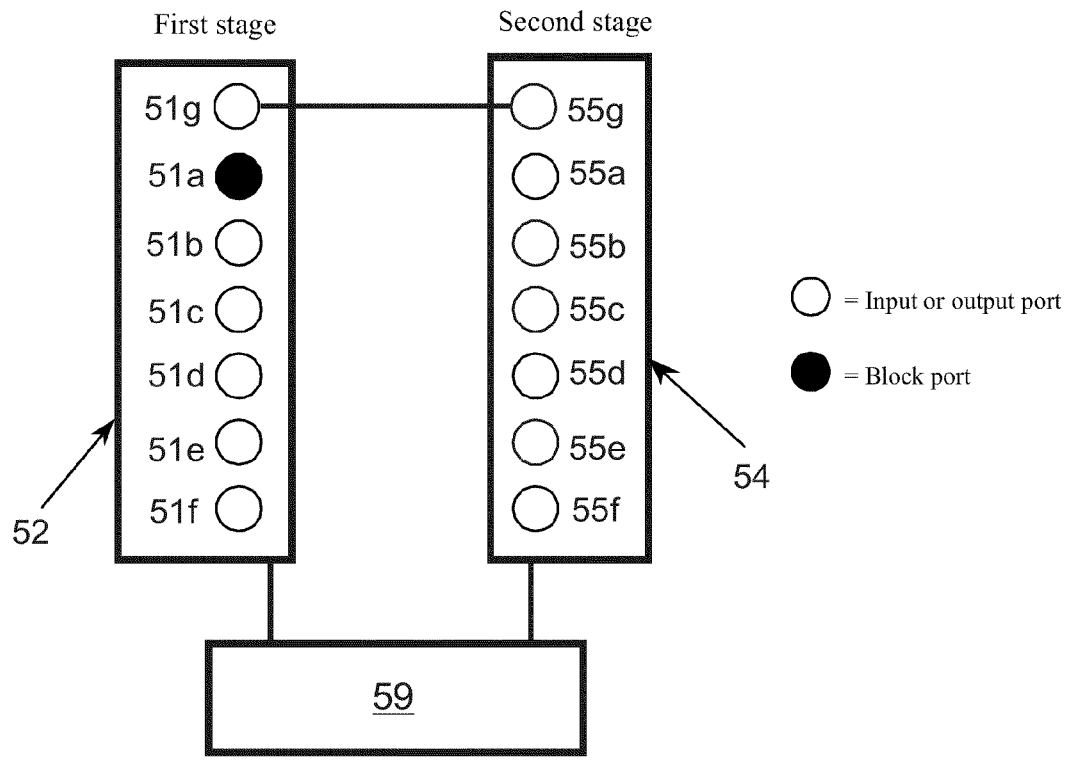
FIG. 5 is a cross-sectional view at A-A' from point 150 of FIG. 1b showing input, output and block ports of a quasi-hitless WSS according to the present invention.

FIG. 5 shows another arrangement which has only one block port, yet still allows 'quasi-hitless' operation. The first stage WSS 52 has five input ports 51*b*-51*f*, an output port 51*g*, and a block port 51*a*, while the second stage WSS 54 has six output ports 55*a*-45*f*, an input port 55*g*, and no block ports. The switching between ports is effected by means of the adjustable reflectors or MEMS mirrors in the first and second stage under the control of a switch controller 59.

During reconfiguration of a particular wavelength multiplexed signal from output port i to output port j, interfering signals at the same wavelength will momentarily appear at output ports i and j. This is 'quasi-hitless' operation. This should not affect any other network traffic, since that wavelength is unused on ports i and j during the switching operation, and is intentionally present on those ports before and after the switching operation. The only potential issue may be security, if the wavelength multiplexed signal momentarily routed to the incorrect ports is of a confidential nature and if there is a possibility that it can be intercepted by an unintended receiving party. The switching procedure is:

1. switch first stage 52 to the block port 51*a* (interfering signals at the same wavelength from other input ports will momentarily appear at the currently configured output port during this operation);
2. switch second stage 54 to a desired output port; and
3. switch first stage 52 to a desired input port (interfering signals at the same wavelength from other input ports will momentarily appear at the final output port during this operation).

The arrangement of FIG. 5 achieves the greatest possible number of input and output ports for a given MEMS tilt angle range, since only one port needs to be reserved as a block port. Note that an arrangement where the block port is on the second stage WSS 54 does not provide hitless switching.

Figure 6:
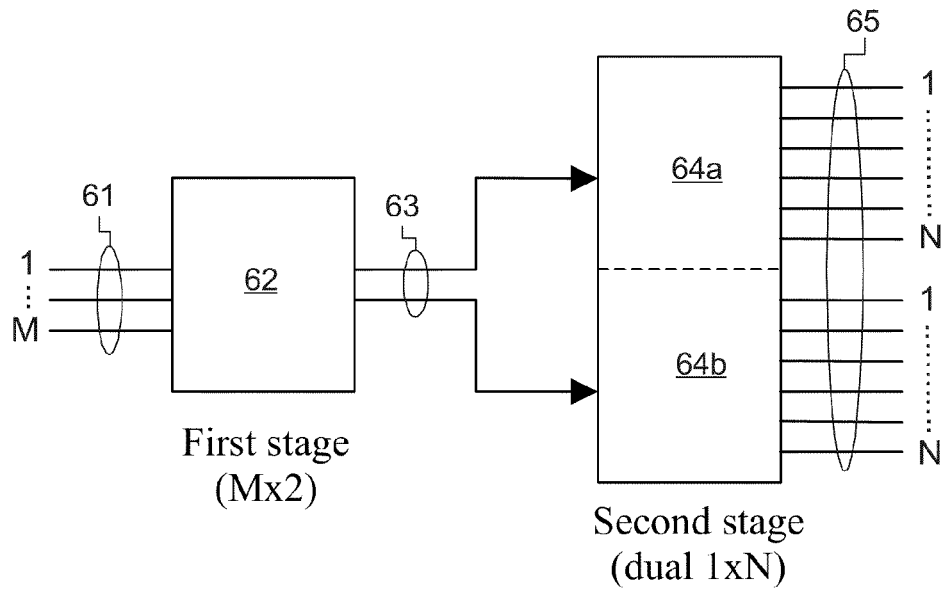
FIG. 6 is a block diagram of a cascaded M×2 and dual 1×N WSS to provide M×2N WSS functionality according to the present invention.

FIG. 6 shows a further arrangement which increases the number of available output ports without increasing the required MEMS mirror tilt angle range. A cascaded M×2 WSS is cascaded with a dual 1×N WSS to provide M×2N WSS functionality. This configuration provides double the number of output ports normally addressable by a single MEMS mirror, at the expense of halving the number of available input ports.

The first stage WSS 62 is configured as an M×2 WSS with M input ports 61, while two second stage WSS 64*a* and 64*b* are configured as a dual 1×N WSS, each with N output ports for a total of 2N output ports 65. The two stages are interconnected with two common ports 63.

Figure 7:
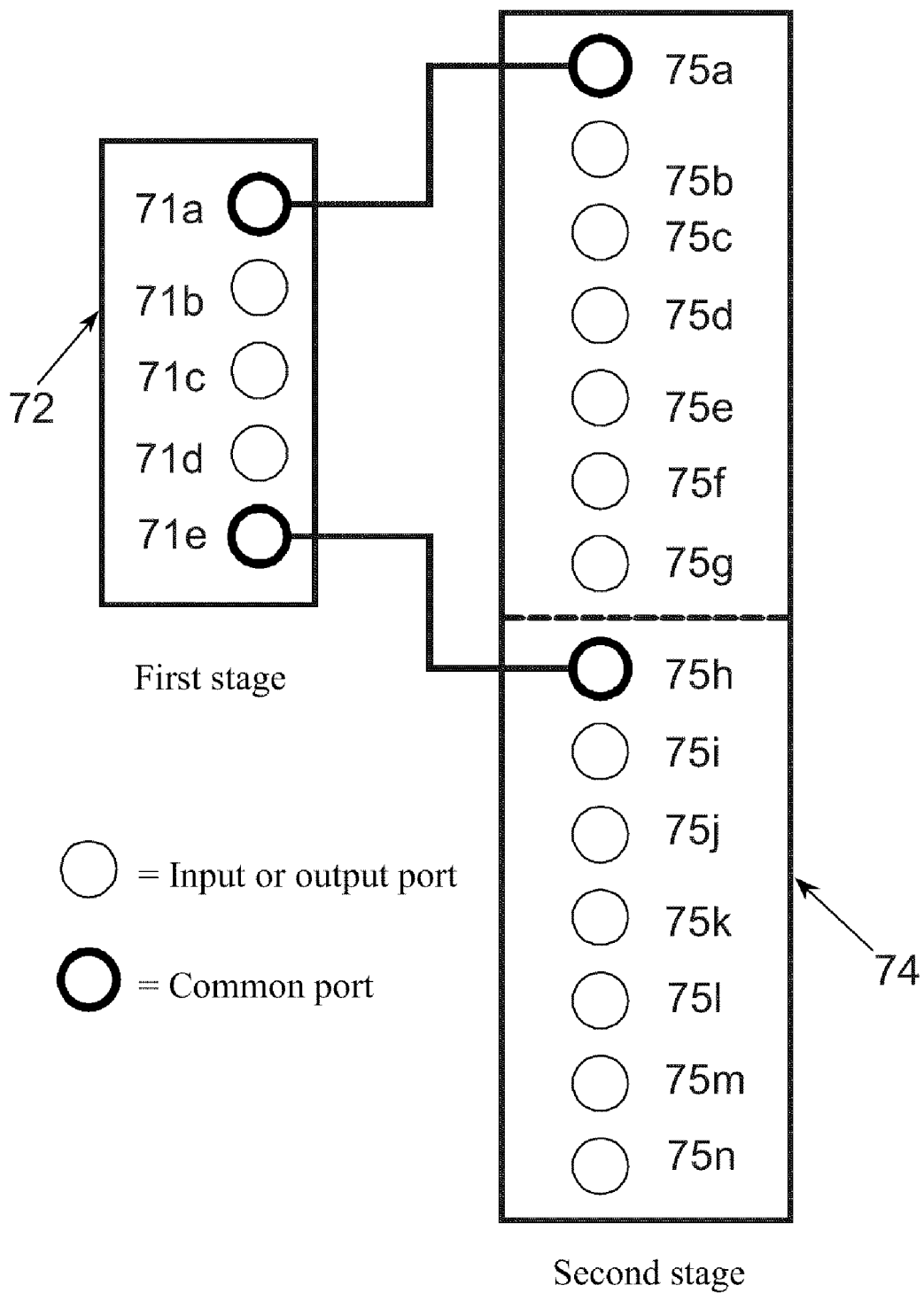
FIG. 7 is a cross-sectional view at A-A' from point 150 of FIG. 1b of the first and second stage WSS's of FIG. 6 according to the present invention.

FIG. 7 illustrates the port configurations needed to achieve the M×2N function, 3×12 in this example. The first stage WSS 72 comprises three input ports 71*b*-71*d* and two output ports 71*a* and 71*e*, while the dual 1×6 second stage WSS 74 comprises two input ports 75*a*, 75*h* and twelve output ports 75*b*-75*g* and 75*i*-75*n*. To interconnect the two stages output ports 71*a* and 71*e* are connected to input ports 75*a* and 75*h*, respectively. One MEMS mirror simultaneously provides an optical connection between the input port 75*a* and the six output ports 75*b*-75*g* as well as between the input port 75*h* and the six output ports 75*i*-75*n*.

In a particular fiber optic network node configuration used by some network suppliers, a 1×2 WSS is used to select signals on wavelength multiplexed channels which are to be sent to an express port and channels which are to be dropped at that node. For further demultiplexing the dropped channels into separate receivers, an array waveguide (AWG) can be used. With channel spacings of 50 GHz, it is common to use an interleaver to separate the channels into 'odd' and 'even' channels onto separate fibers, the odd channels and the even channels now being spaced by 100 GHz.

This is advantageous because it is much easier and cheaper to manufacture an AWG for separating 100 GHz spaced channels compared to an AWG for separating 50 GHz spaced channels. The cost savings in the AWG's offsets the cost of the added interleaver. This type of node configuration is used rather than simply a 1×N WSS because, particularly for networks with 50 GHz channel spacing, the number of dropped channels (which could be 40 or more at a single node) can exceed the current capability for 1×N WSS (which is in the range of 9 to 16 ports). For some WSS manufacturing methods, for example those using liquid crystal polarization switching, the complexity and cost of the WSS increases as the port count is increased, because of the need to add additional liquid crystal switching elements to accommodate an increased number of output ports.

For WSS devices using tilting MEMS mirror arrays however, the addition of extra ports only requires an increased MEMS mirror tilt angle to be able to select among an increased number of ports, and thus the added complexity and cost is minimal. For a MEMS-based WSS, the cost difference between a 1×2 WSS and a 1×3 WSS is very small. Therefore, if a MEMS-based WSS is used, the node configuration shown in FIG. 8a becomes preferable, eliminating the need for an interleaver. The added cost of the 1×3 WSS compared to a 1×2 WSS is less than the cost of the interleaver, resulting in a lower overall cost and eliminating the insertion loss of the interleaver.

In the configuration of FIG. 8a, a DWDM signal which is carrying traffic on several wavelength multiplexed channels within a given wavelength band at a 50 GHz spacing is applied to an input port 83 of a 1×3 WSS 80. Only odd-numbered channels 85b are directed to the 'odd' port, and only even-numbered channels 85c are directed to the 'even' port. Express channels 85a are directed to the 'express' port. As the odd-numbered channels 85b are spaced at 100 GHz, a 100 GHz AWG 81 may be used to produce demultiplexed channels 88. Similarly the even-numbered channels 85c are demultiplexed by a 100 GHz AWG 82 into demultiplexed channels 89.

One potential difficulty with a 1×3 WSS based on MEMS tilting mirrors is "hitting", or sending light to undesired output ports during switching operations. This is illustrated in FIG. 8b. If by tilting the MEMS mirror 86 in 1-dimension it is desired to redirect a particular optical channel beam entering through input port 83 from output port 85a (express port, for example) to output port 85c (even channel port, for example), the light may momentarily be directed to output port 85b (odd channel port, for example) as it follows a '1-dimensional path' 87a.

In the node configuration of FIG. 8a this can cause problems because the unwanted even-numbered channel signal on output port 85c will interfere with adjacent odd-numbered wavelength channels. The AWG designed to separate 100 GHz spaced channels will not provide sufficient isolation to prevent interference from the unwanted even signal which is only 50 GHz spaced from the adjacent odd channels.

A possible way of preventing "hitting" is to employ a biaxially tilting MEMS mirror 86 in the WSS 80 to direct the optical channel beam along a '2-dimensional path' 87c as illustrated in FIG. 8b. Before tilting the MEMS mirror 86 about a first axis to perform switching, the mirror is first tilted about a second axis to direct the optical channel beam away from the output ports, so as to prevent the beam from hitting output port 85b.

A disadvantage with this approach is the added manufacturing cost from the additional complexity of MEMS mirrors capable of being tilted about two axes, and from the additional drive circuitry required to control the tilting sequence of each MEMS mirror about the two axes independently.

Figure 8C:
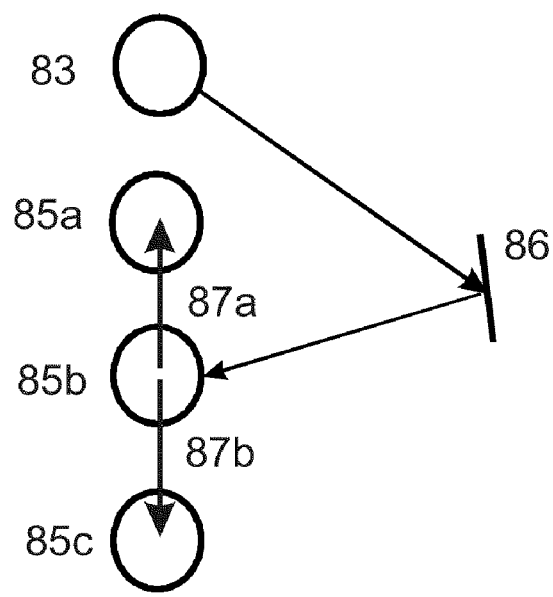

A solution which is applicable in the case of the node configuration of FIG. 8a is to arrange the port configurations of the WSS as shown in FIG. 8c. Here the express output port 85b lies between the odd output port 85a and the even output port 85c. In this configuration, hitting is avoided because each individual MEMS mirror 86 by tilting in only 1-dimension is required to switch only between two adjacent output ports, i.e. either between the express output port 85b and the odd output port 85a (for MEMS mirrors corresponding to odd-numbered channels) or between the express output port 85b and the even output port 85c (for mirrors corresponding to even-numbered channels). It is never required to switch a mirror between the odd output port 85a and the even output port 85c.

A further advantage is obtained if the ports are separated somewhat, such that there is unused space between the output ports 85a, 85b and 85c. This enables an attenuation function to be implemented by directing the optical beam slightly away from the output port towards the unused space between ports. The separated ports introducing optical attenuation without causing crosstalk, or light directed into an unwanted port. For example, attenuation at the express port for odd-numbered channels would be achieved by offsetting the mirror tilt angle slightly away from the express output port 85b toward output port 85a. Attenuation at output port 85a would be achieved by offsetting the mirror tilt angle slightly away from output port 85a toward the express output port 85b. Attenuation at the express output port 85b for even-numbered channels would be achieved by offsetting the mirror tilt angle slightly away from the express output port 85b toward output port 85c, and attenuation at output port 85c would be achieved by offsetting the mirror tilt angle slightly away from output port 85c toward the express output port 85b.

Note that switching among all three ports can be achieved even if the MEMS mirrors can be tilted in only one direction away from their rest position. The rest position does not need to correspond with output port 85b. For example, the mirror rest position may correspond to an optical beam position slightly above output port 85a. Then, by moving the optical beam only downwards, the optical beam may be aligned to output ports 85a, 85b or 85c.

This allows each MEMS mirror to be controlled by only a single driving electrode, thus saving cost on the drive electronics. This principle applies equally well for configurations in which the input and output ports are exchanged.

Figure 9A:
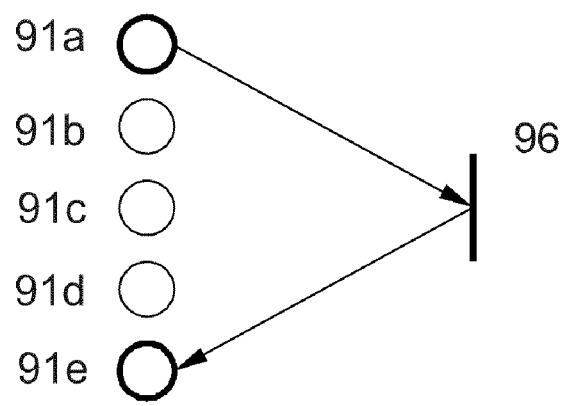
FIGS. 9a-9c are simplified drawings of a 3×2 WSS with a single 1-dimensionally tilting MEMS mirror array shown in a 'block' setting, an input port coupled to one of the output ports, and the same input port coupled to the other output port.
Figure 9B:
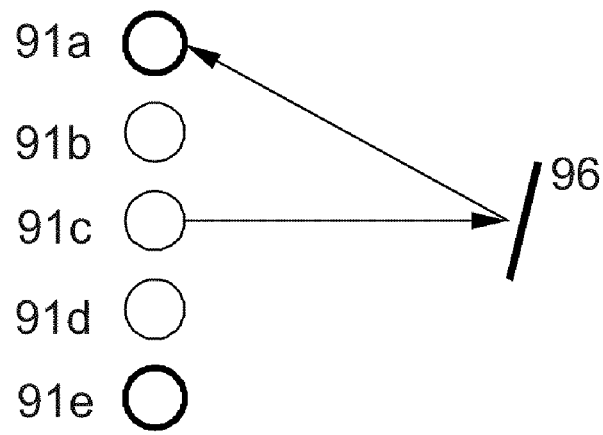
Figure 9C:
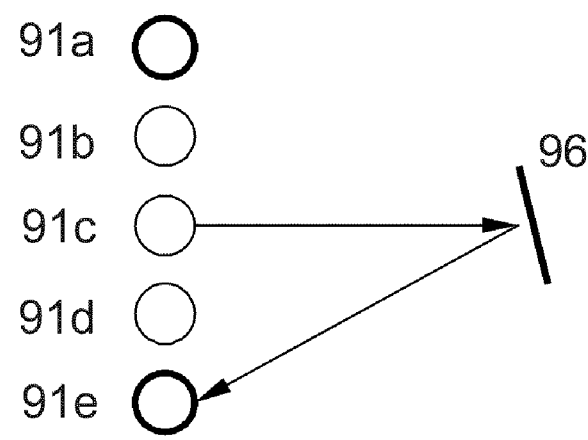

FIGS. 9a-c illustrate a first stage of a M×N WSS for quasi hitless operation. A M×2 WSS uses a single 1-dimensional tilting MEMS mirror array according to the invention. The M×2 WSS comprises three input ports 91b-91d and two output ports 91a and 91e. A MEMS mirror 96 is shown schematically for illustration purposes. (The second stage WSS is configured as a dual 1×N WSS).

The tilt angle range of the MEMS mirror 96 needs to be at least enough to select among 2M+1 discrete ports, corresponding to the 2M+1 possible settings of the WSS: M inputs routed to output port 91a, M inputs routed to output port 91e, plus the setting where the two output ports 91a, 91e are coupled to each other, which corresponds to a block setting in this embodiment.

The block setting is illustrated in FIG. 9a. The MEMS mirror 96 is tilted such that the two output ports 91a and 91e are optically coupled together such that none of the input ports 91b-91d are connected to either output port.

If a block setting is not required, input port 91b and output port 91a could occupy the same port position, with a circulator connected to the port to provide separation of the input and output signals, thus requiring only 2M discrete ports addressable by the MEMS.

For connecting e.g. input port 91c to output port 91a, as shown in FIG. 9b, starting with the block setting (FIG. 9a), the MEMS mirror 96 is tilted so that the output port 91a is sequentially coupled through all interstitial input ports (input port 91*d* in this example) until it reaches coupling with input port 91*c*. Obviously, there will be transient signals from the interstitial input ports transmitted to the output port 91*a*, however these are of little concern, with perhaps the security question mentioned earlier.

Alternatively, for connecting e.g. input port 91*c* to output port 91*e*, as shown in FIG. 9*c*, the WSS is first brought to the block setting (FIG. 9*a*), the MEMS mirror 96 is tilted so that the output port 91*e* is sequentially coupled through all interstitial input ports (input port 91*b* in this example) until it reaches coupling with input port 91*c*.

Figure 10:
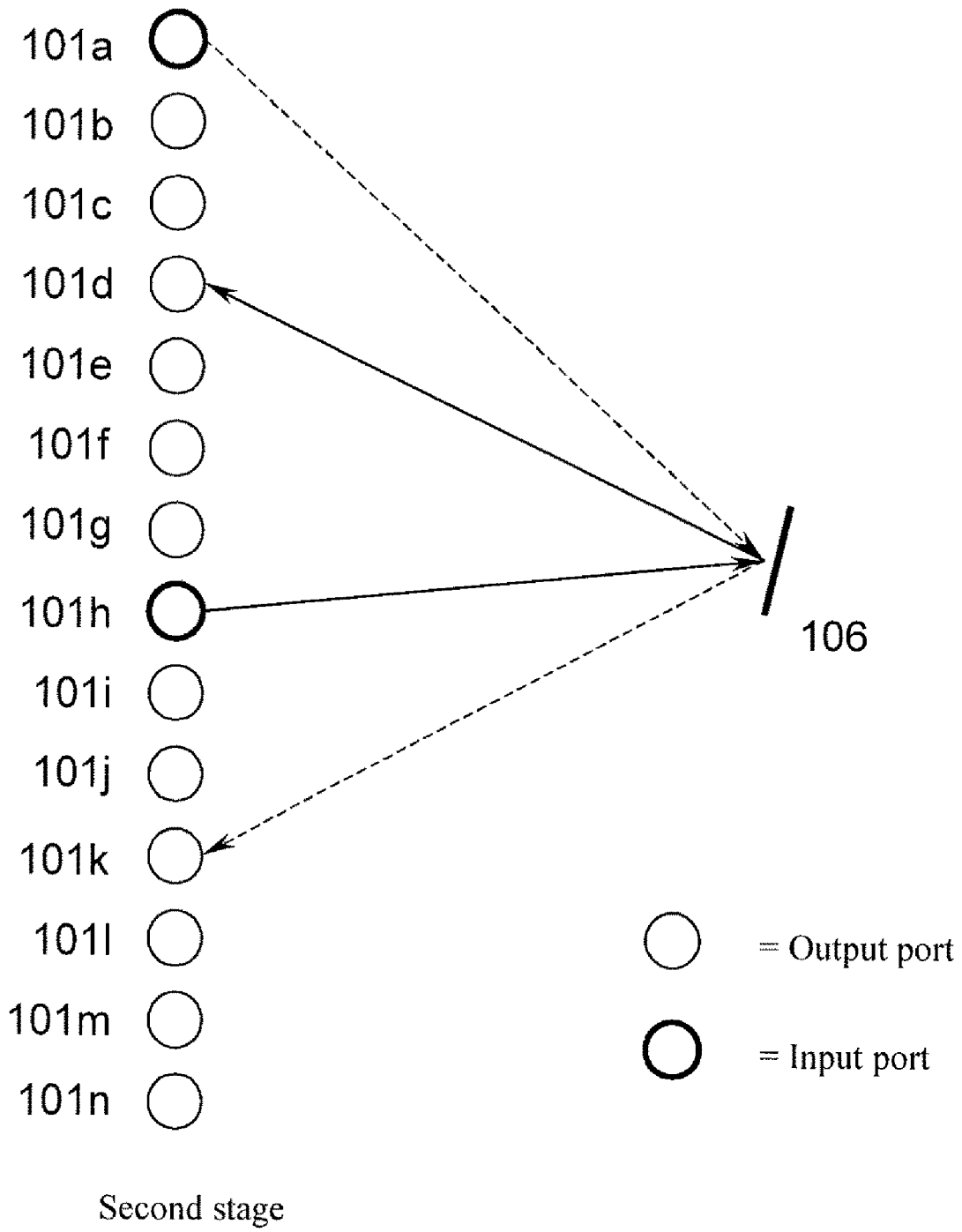
FIG. 10 is a simplified drawing of a dual 1×N WSS using a single 1D tilting MEMS mirror array according to the present invention.

FIG. 10 illustrates a second stage of the M×N WSS in FIG. 6, in which a dual 1×N WSS functionality can be achieved with a single MEMS mirror array. Two input ports 101*a*, 101*h* and twelve output ports 101*b*-101*g*, 101*i*-101*n* are arranged in a collinear fashion. The number of ports can be doubled in this way by reflecting two lightwave beams from input ports 101*a*, 101*h* off the same MEMS mirror 106. The switching procedure for quasi-hitless operation is the same as that of the arrangement in FIG. 5.

Although there are two paths connecting the first stage WSS and the second stage WSS in FIG. 6, it is still only possible to route one instance of a particular wavelength from one input port to one output port. In other words the WSS still has wavelength blocking.

Figure 11:
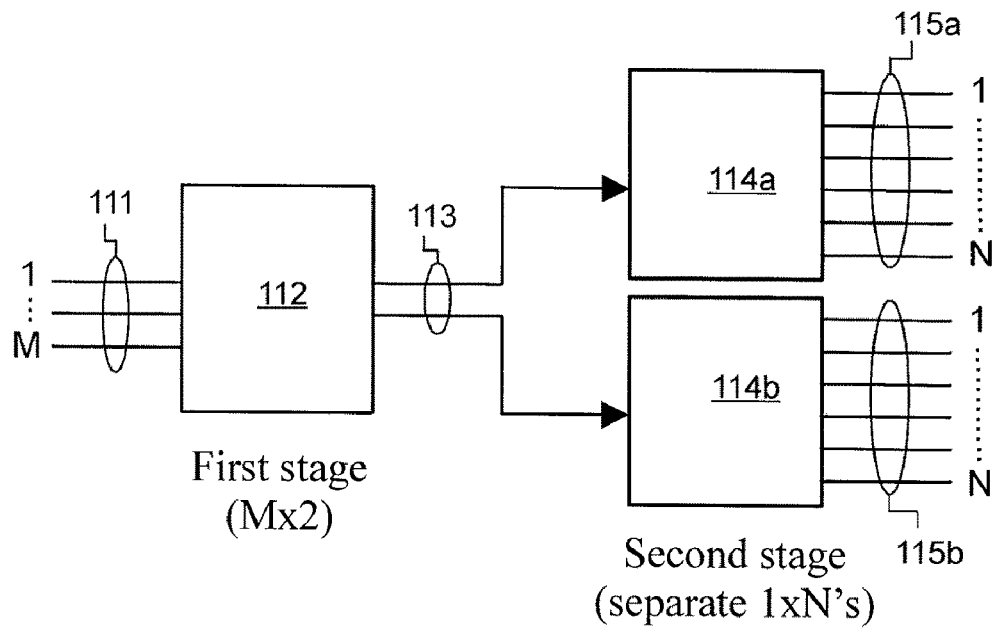
FIG. 11 is a block diagram of a cascaded M×2 and two separate 1×N WSS's to provide M×2N WSS functionality according to the present invention.

FIG. 11 shows a configuration which uses two separate second stage WSSs. The first stage WSS 112 is a M×2 WSS similar to that shown in FIG. 5, having M inputs 111 and two outputs 113. The outputs 113 are each coupled to a second stage comprising separate 1×N WSSs 114*a*, 114*b*. However, because the two second stage WSSs are separate, having independent control, one of the second stage WSS's 114*a* can be set to route a particular wavelength multiplexed signal to an output port 115*a*, while the other (unused) second stage WSS 114*b* can be set to block that wavelength multiplexed signal. This means that undesired couplings may be permitted to the unused output port of the first stage, because those undesired signals can be blocked by the second stage WSS.

Figure 12A:
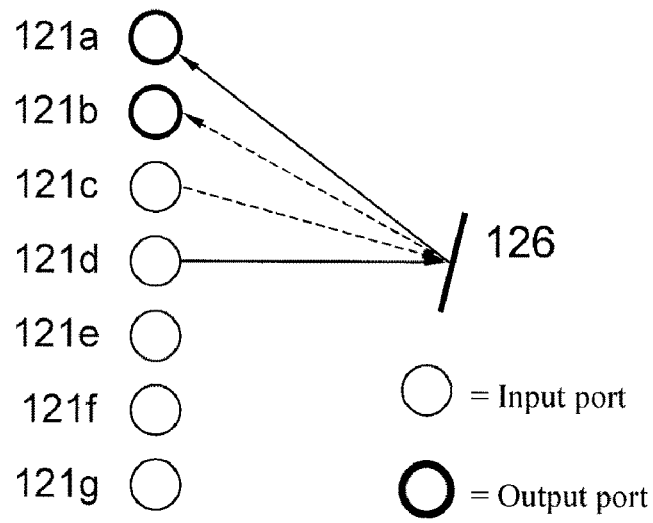
FIGS. 12a and 12b are simplified drawings of the M×2 WSS as used in FIG. 11, showing two different pairs of inputs coupled to the pair of outputs, respectively.
Figure 12B:
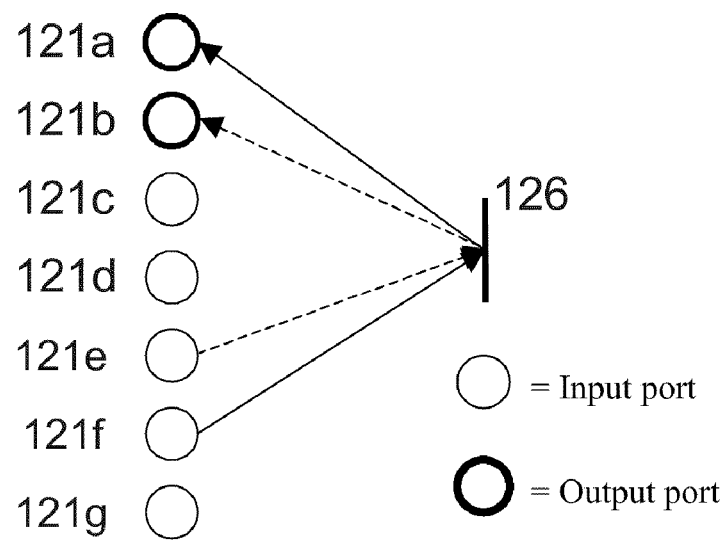

Another embodiment of the first stage WSS for e.g. the M×2N WWS of FIG. 11 is shown in FIGS. 12*a* and 12*b*, where the two output ports 121*a*, 121*b* may be placed adjacent to one another at one end of the row of input ports 121*c*-121*g*. (This is in contrast with FIG. 7 where the two output ports 71*a*, 71*e* were arranged at opposite ends of the input/output port array). This port configuration has the property that multiple input/output connections are made at the same time, but as mentioned, the undesired connection can be blocked by the second stage WSS. In particular, FIG. 12*a* illustrates a switching state with input ports 121*d*, 121*c* coupled to output ports 121*b*, 121*a*, respectively. Similarly, FIG. 12*b* illustrates a switching state with input ports 121*f*, 121*e* coupled to output ports 121*b*, 121*a*, respectively.

This configuration has the property that multiple input/output connections are made at the same time, but as mentioned, the undesired connection can be blocked by the second stage WSS. In FIG. 11, each second stage WSS 114*a*, 114*b* must have a block port, and the block setting must be used whenever a particular wavelength multiplexed signal is not intentionally routed through that second stage WSS. The first stage WSS 112 must have a block setting also. Referring again to FIG. 12, the block setting in this case could be the setting where output port 121*a* couples to output port 121*b*. The MEMS tilt angle range needed is M+2, which compares favorably with 2M+1 for the configuration of FIG. 7, thereby permitting more input ports to be accommodated than the configuration of FIG. 6.

With reference to FIG. 11, a quasi-hitless switching procedure is:
1. switch first stage to block (interfering signals at the same wavelength from other input ports will appear at the currently configured output port during this operation);
2. switch second stage WSS to desired output port;
3. switch unused second stage WSS to block; and
4. switch first stage to desired input port (interfering signals at the same wavelength from other input ports will appear at the final output port during this operation).

A fully hitless switching procedure could be implemented if the second stage WSS's have a block port adjacent to each output port (as in FIG. 4), instead of just one block port.

FIG. 11 could be expanded to use an M×3 first stage WSS and three 1×N second stage WSS's, or an M×4 first stage WSS and four 1×N second stage WSS's, and so on. This can be realized with a first stage WSS with three, four, or more adjacent output ports. The required mirror tilt angle range on the first stage becomes M+3, M+4, and so on. The number of output ports becomes 3N, 4N, and so on.

Figure 1C:
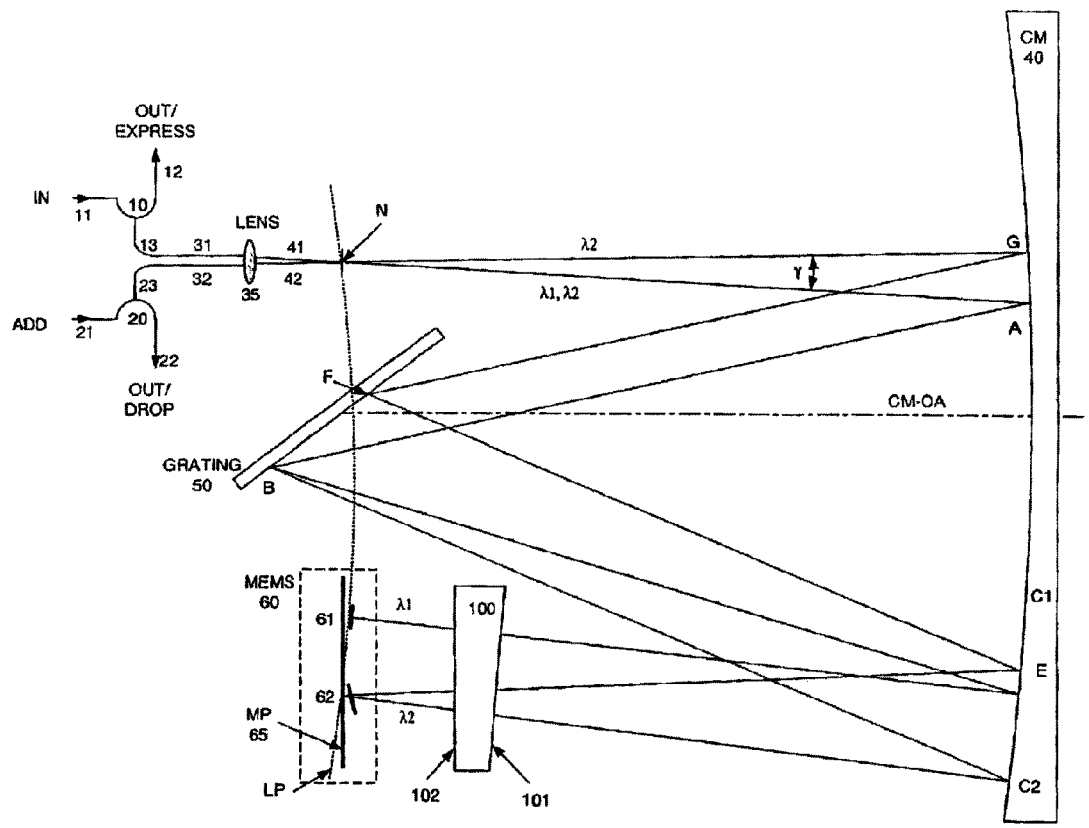
FIG. 1c is a top view of a prior art WSS showing greater detail.
Figure 13:
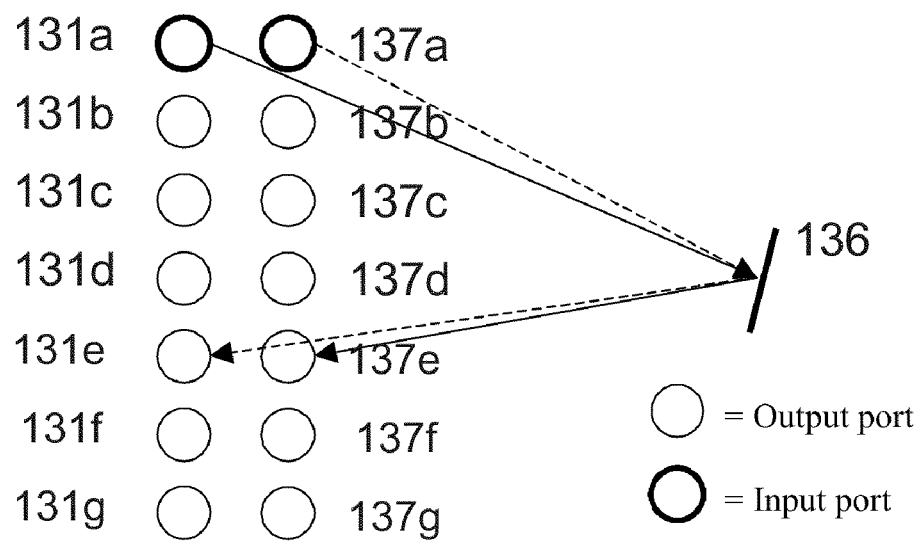
FIGS. 13 and 14 are simplified drawings of an alternative port configuration according to the present invention for a dual 1×N WSS using a single 1D tilting MEMS mirror array where ports are arranged in two parallel rows rather than one single row.

FIG. 13 is an end-on view of an alternative port configuration for a dual 1×N WSS (cf FIG. 7 second stage). In this configuration the ports are arranged in two rows, 131*a*-131*g*, 137*a*-137*g*, instead of in a single row. This has the advantage that the height of the optics is reduced (e.g. the height of the spherical mirror 120 in FIG. 1*a*). To realize the port configuration of FIG. 13, the port 31 in FIG. 1*c* is replaced by seven ports 131*a*-131*g* vertically stacked (out of the plane of the drawing), and the port 32 is replaced by seven ports 137*a*-137*g* vertically stacked, thus creating a 2×7 array of ports as illustrated in FIG. 13.

However, it is important to note that the MEMS mirrors need only tilt in one direction (deflecting beams out of the plane of the drawing in FIG. 1*c*) to accomplish port switching in the dual 1×N device. Because input port 131*a* is opposite output ports 131*b* through 131*g*, and input port 137*a* is opposite output ports 137*b* through 137*g*, the natural reflection from the MEMS mirror 136 in the horizontal plane will couple input port 131*a* to one of the output ports 131*b* through 131*g*, and couple input port 137*a* to one of the output ports 137*b* through 137*g*, without the need for the MEMS mirror 136 to deflect the lightwave beams in the horizontal plane.

Figure 14:
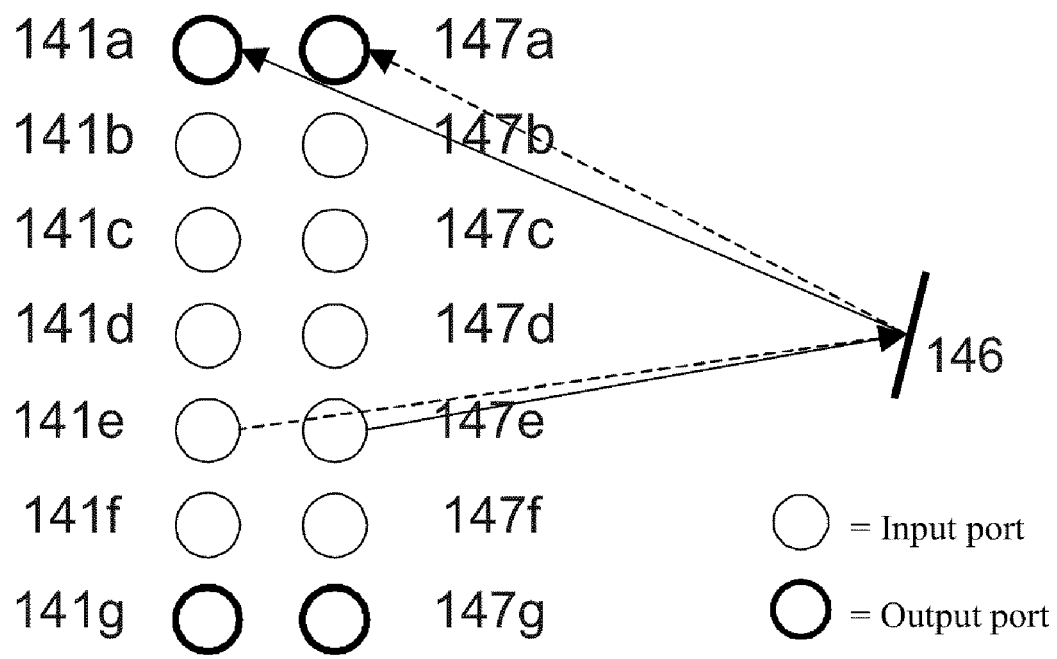

FIG. 14 shows a port configuration for a dual M×2 WSS, which is similar to that in FIG. 13. The ports are arranged in an array with two parallel rows, however the output ports 141*a*, 147*a* are placed at one end of the array and output ports 141*g*, 147*g* at the other end. The input ports 141*b*-141*f*, 147*b*-147*f* are arranged in two rows between the output ports 141*a*, 147*a* and 141*g*, 147*g*, respectively. The operation is similar to that illustrated in FIG. 9, but with two simultaneous port connections being made.

Further extensions and alternate configurations are possible, for example the number of ports do not need to be exactly as illustrated here; the number M or N of input or output ports can be increased or decreased in a straightforward manner. In the dual-WSS port configurations of FIGS. 10, 13, and 14, further parallel 1×N or 2×N WSS's may be added by adding more ports, for example a triple 1×6 WSS can be created by extending FIG. 13 (*a*) to a 3×7 array of ports, thus creating effectively three WSS units which are switched simultaneously with a single MEMS array. Similarly FIG. 10 can be extended to a triple 1×N WSS by adding a third set of input and output ports on the end of the linear array of ports. In FIG. 12, additional input or output ports can be added, thus creating an M×N WSS with any number of input and output ports.

We claim:

1. An optical device for providing quasi hitless switching, comprising:
   a first wavelength selective switch comprising:
      a plurality of input ports, each input port for receiving a respective DWDM signal, each DWDM signal comprising a plurality of wavelength signals;
      a first and a second common port for transmitting a selected wavelength signal from a selected the respective DWDM signal; and
      a first uniaxially tilting MEMS mirror for selecting an optical path for the selected wavelength signal between one of the first and second common ports and one of the plurality of input ports;
   a second wavelength selective switch comprising:
      a third common port optically coupled to the first common port for receiving the selected wavelength signal;
      a first set of output ports adjacent to the third common port for transmitting the selected wavelength signal;
      a fourth common port adjacent to the first set of output ports and optically coupled to the second common port for receiving the selected wavelength signal;
      a second set of output ports adjacent to the fourth common port for transmitting the selected wavelength signal; and
      a second uniaxially tilting MEMS mirror for selecting an optical path for the selected wavelength signal between the third common port and one of the first set of output ports and between the fourth common port and one of the second set of output ports;
      wherein the third common port, the first set of output ports, the fourth common port and the second set of output ports are collinear; and
   a switch controller controlling the first MEMS mirror for optically coupling the first common port with the second common port, while the second MEMS mirror is adjusted between output ports.

* * * * *